Sept. 9, 1958
R. A. McCALLUM
2,851,151
FLEXIBLE FRAME CONVEYOR
Filed June 22, 1955
2 Sheets-Sheet 1
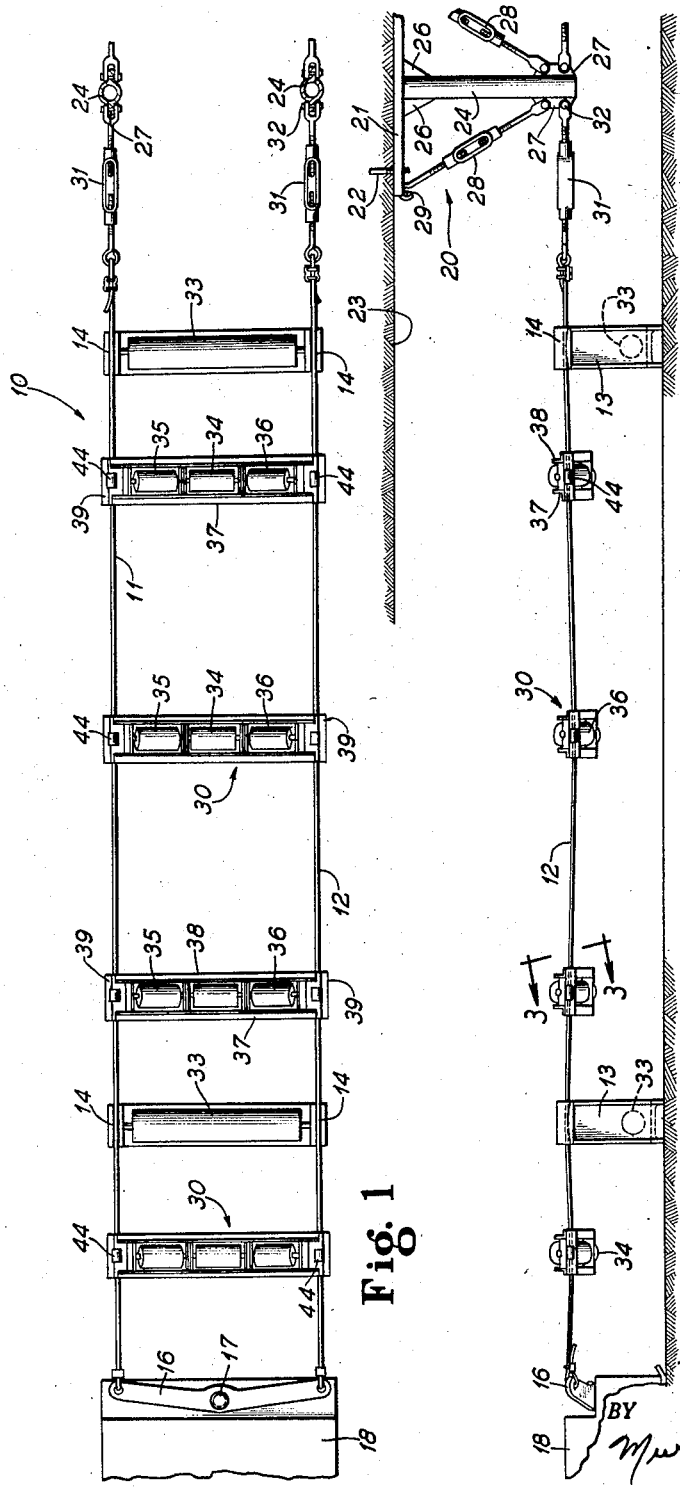
INVENTOR.
Robert A. McCallum
BY
Murray A. Gleeson
ATTORNEY Sept. 9, 1958 R. A. McCALLUM 2,851,151
FLEXIBLE FRAME CONVEYOR
Filed June 22, 1955 2 Sheets-Sheet 2
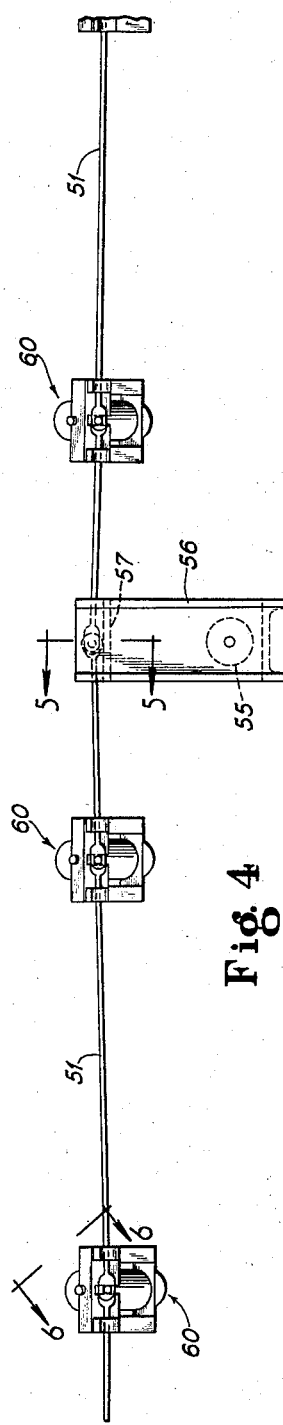
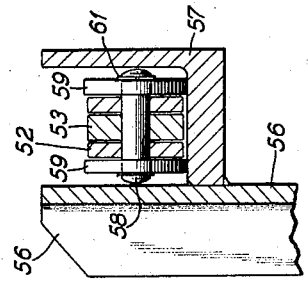
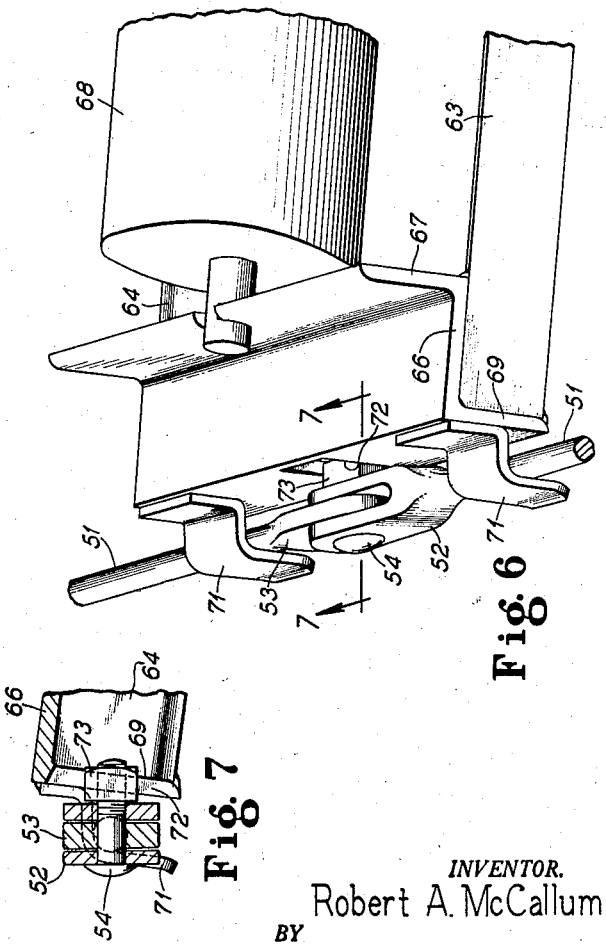
INVENTOR.
Robert A. McCallum
BY
Murray A. Gleeson
ATTORNEY

United States Patent Office 2,851,151
Patented Sept. 9, 1958

2,851,151

FLEXIBLE FRAME CONVEYOR

Robert A. McCallum, Clarendon Hills, Ill., assignor to Goodman Manufacturing Company, Chicago, Ill., a corporation of Illinois Application June 22, 1955, Serial No. 517,316

11 Claims. (Cl. 198—192)

This invention relates generally to endless conveyors and more particularly to improvements in arrangements for aligning the troughing rollers supporting the conveying reach of such conveyors.

It is a principal object of this invention to provide an improved arrangement for correctly aligning the troughing rollers of an endless conveyor of the type which is supported upon a pair of spaced flexible strands.

Another object is to provide an improved conveyor of the type which is supported upon laterally spaced elongated flexible members, and to provide construction whereby the troughing rollers therefor may easily be adjusted in position so as to be normal to the direction of travel to the conveying reach.

Other objects and important features of the invention will be apparent from a study of the specification following taken with the drawings which together describe and illustrate a number of preferred embodiments of the invention, and what are now considered to be the best modes of practicing the principles thereof. Additional embodiments of the invention may be suggested to those having the benefit of the teachings herein, and it is therefore intended that the scope of the invention not be limited by the embodiments herein shown, such other embodiments being intended to be reserved especially as they fall within the terms of the claims subjoined.

In the drawings:

Fig. 1 is a plan view of an endless conveyor showing one embodiment of the improvements according to the present invention;

Fig. 2 is a side view thereof;

Fig. 3 is a fragmentary perspective view of one of the troughing roller assemblies for the conveyor seen in Figs. 1 and 2, and showing means whereby the assembly may be disposed in proper position on the flexible support members of the endless conveyor seen in Figs. 1 and 2, said view being taken substantially in the direction of the arrows 3—3 of Fig. 2;

Fig. 4 is a side view of an endless conveyor embodying different forms of the invention herein;

Fig. 5 is a vertical section taken along the line 5—5 of Fig. 4 looking in the direction of the arrows, and illustrating a saddle for support of the laterally spaced elongated flexible support members of the conveyor seen in Fig. 4;

Fig. 6 is a perspective view of a portion of one of the troughing roller assemblies seen in Fig. 4, said view being taken looking in the direction of the arrows 6—6 of Fig. 4; and Fig. 7 is a section taken along the line 7—7 of Fig. 6 looking in the direction of the arrows, showing the means for locating the troughing roller assembly upon the laterally spaced flexible support members.

Referring now particularly to Figs. 1 to 3 of the drawings, there is shown an endless conveyor 10 of the type which is supported upon a pair of flexible support members, such as strands 11 and 12. Each of said strands is supported at intervals throughout its length upon standards 13, each having a pair of laterally spaced saddles 14 in which the strands 11 and 12 are guided and supported.

Each of the strands 11 and 12 is anchored at the outby end thereof to a swivel member 16 having swiveling connection 17 to a head frame 18 of an outby belt drive unit. The inby ends of the strands 11 and 12 are anchored to an anchor structure indicated generally by the reference numeral 20. The anchor structure 20 includes a roof plate 21 which is held by roof pinning 22 to the roof 23 of the entry shown. A vertical truss member 24 extends downwardly from the roof plate 21 and is braced in part by gusset plates 26.

The vertical truss member has a gusset plate 27 fixed at the lower end thereof, and adjustable stress members 28 extend diagonally upward therefrom to be anchored as at 29 to the ends of the roof plate 21. Each of the strands 11 and 12 is anchored to the anchor structure 20 through the medium of turnbuckles 31 which are connected at 32 to the gusset plate 27.

A plurality of troughing roller assemblies indicated generally by the reference numeral 30 are spaced at intervals along the flexible strands 11 and 12, and support a conveying reach of a belt, not shown, of the conveyor 10, of the return reach of the belt, not shown, is guided over return idler rollers 33 mounted upon the supports 13.

Each of the troughing roller assemblies 30 includes a bottom load supporting roller 34 and inclined troughing rollers 35 and 36 which provide the proper contour for the conveying reach of the conveying belt in a manner well known in the art. The rollers 34, 35 and 36 of each troughing assembly 30 are secured to transverse extending support members 37 and 38, as seen in Fig. 3, and these are anchored at each end to an angle member 39 having a central milled slot 41 formed therein at the juncture of the legs 42 and 43 of the angle member 39.

Means are provided to properly locate the troughing roller assemblies 30 in position on the flexible strands 11 and 12, and to this end each of the strands has, spaced uniformly throughout its length, locating collars 44 which project therefrom and which are held, in any desirable manner, firmly to the strands 11 and 12, as by means of a set screw, not shown.

After locating the troughing roller assemblies 30 upon the flexible strands 11 and 12 at the locating collars 44, the troughing roller assembly should extend in a direction normal to the axis of the conveying reach of the belt, not shown, in order to insure proper training thereof. In order to locate the troughing roller assemblies 30 in the position described, the flexible strands 11 and 12 may be shifted with respect to each other by adjusting the turnbuckles 31 associated with each strand. This causes pivoting of the swivel member 16 about its connection 17 to the head frame 18, and the turnbuckles 31 may be adjusted until the conveying reach is tracking properly over each troughing roller assembly 30.

Referring now to Figs. 4 to 7 of the drawings, there is shown an alternate embodiment of the invention wherein the flexible strands 11 and 12 are replaced by elongated flexible support members, such as rods 51 or the like, which are spaced laterally of each other, as in the case with the embodiment shown in Figs. 1 to 3 inclusive. Each of said rods 51 has a clevis 52 at one end thereof, while the corresponding opposite end of the adjacent rod 51 terminates in an eye connection 53, connection being made between each by a bolt 54 passing through the clevis 52 and the eye connection 53 with the bolt 54 projecting therefrom, see also Fig. 7.

The rods 51 are supported in properly spaced relationship laterally of each other upon standards 56, each standard being arranged with a saddle 57 for supporting the described connection. A pin 58 passes through the clevis 52 and the eye connection 53 at such saddle 57, and the connection is flanked by rollers 59, the entire assembly being completed by C-snap rings 61 encircling the pin 58. It will be noted that the rollers 59 enable the members to move freely longitudinally at the saddle 57.

A troughing roller assembly 60 is located at each of the connections of the rods 51 to each other, intermediate the supports 56, and such troughing roller assemblies are constructed in a manner well known in the art. As seen in Fig. 6, the troughing assembly 60 includes transverse extending members 63 and 64 for support of the troughing rollers. The members 63 and 64 are joined at their ends by a Z-bar member 66, said Z-bar member having an upstanding flange 67 affording a support for one end of a troughing roller 68 and a downstanding flange 69 having clips 71 welded thereto. The clips 71 afford a means whereby the assembly may be caused to rest upon the rods 51 on each side of the clevis connection 52 and the eye connection 53.

Means are provided for locating the troughing roller assemblies 60 at each of the jointed connections aforesaid of the rods 51, and to this end the downstanding flange 69 has disposed centrally thereof a slot 72 adapted to embrace a nut 73 threaded to the bolt 54.

Tension can be placed upon the rods 51 in the manner as described with reference to the anchor structure 20 of Figs. 1 and 2, and once the troughing roller assemblies are placed in position thereon, the conveying reach, not shown, of the belt conveyor may be placed thereon, the return reach of the belt being guided by a return idler roller 55 at each support standard 56.

As with the example described with reference to Figs. 1 to 3 inclusive, the so-connected rods 51 may be shifted with respect to each other so that the troughing roller assemblies are in a position normal to the longitudinal axis of the conveying reach of the belt, not shown, to insure proper tracking thereof. Such may be accomplished by adjusting turnbuckles 31, as in the case described with Figs. 1 and 3, the outby ends of the rods 51 being connected to a swivel member 16 also described with reference to Fig. 1.

In either embodiment of the invention the conveyor may be extended by adding new flexible support members, such as strands or cables 11 and 12 as in the case of Fig. 1, or by adding additional rods 51 as in the case of Fig. 4, the inby ends of the additional sections being connected to an anchor structure 20, and the usual inby idler unit being connected as is customary.

While the invention has been described in terms of a number of preferred embodiments thereof its scope is intended to be defined only by the claims here appended.

I claim as my invention:

1. In an endless conveyor having a conveying reach, a pair of laterally spaced elongated flexible support members, troughing roller assemblies extending laterally of said support members and supported thereon, said troughing roller assemblies being spaced throughout the length of said elongated flexible support members, locating means carried by each of said support members at intervals spaced throughout the length thereof for said troughing roller assemblies, a support bracket at each end of each troughing roller assembly cooperating with said locating means, and means for shifting said elongated flexible support members whereby said locating means are so disposed that the troughing roller assemblies adopt positions normal to the longitudinal axis of said conveying reach, said last named means comprising a swivel member connecting one end of said support members, and means for taking up and releasing said support members.

2. In an endless conveyor having a conveying reach, a pair of laterally spaced elongated flexible support members, troughing roller assemblies extending laterally of said support members and supported thereon, said troughing roller assemblies being spaced throughout the length of said elongated flexible support members, a locating collar carried by each of said support members for said troughing roller assemblies, a support bracket at each end of each troughing roller assembly having a slot therein embracing with said locating collar, and means for shifting said elongated flexible support members whereby said locating means are so disposed that the troughing roller assemblies adopt positions normal to the longitudinal axis of said conveying reach, said last named means comprising a swivel member connecting one end of said support means, and means for taking up and relieving said support members.

3. In an endless conveyor having a conveying reach, a pair of laterally spaced elongated flexible support members, troughing roller assemblies extending laterally of said support members and supported thereon, said troughing roller assemblies being spaced throughout the length of said elongated flexible support members, a locating collar carried by each of said support members for each of said troughing roller assemblies at spaced intervals on said support members, each of said troughing roller assemblies having a slot embracing the respective collar, and means for shifting said elongated flexible support members whereby said locating collars are so disposed that the troughing roller assemblies adopt positions normal to the longitudinal axis of said conveying reach.

4. In an endless conveyor having a conveying reach, a pair of laterally spaced elongated flexible support members, troughing roller assemblies extending laterally of said support members and supported thereon, said troughing roller assemblies being spaced throughout the length of said elongated flexible support members, locating means carried by each of said support members at intervals spaced throughout the length thereof for said troughing roller assemblies, a support bracket at each end of each troughing roller assembly cooperating with said locating means, and means for shifting said elongated flexible support members whereby said locating means are so disposed that the troughing roller assemblies adopt positions normal to the longitudinal axis of said conveying reach.

5. In an endless conveyor having a conveying reach, a pair of laterally spaced elongated flexible support members longitudinally shiftable relative to each other, troughing roller assemblies extending laterally of said support members and supported thereon, said troughing roller assemblies being spaced throughout the length of said elongated flexible support members, locating means carried by each of said support members and projecting therefrom for said troughing roller assemblies, and a support bracket at each end of each troughing roller assembly cooperating with the respective locating means.

6. In an endless conveyor having a conveying reach, a pair of laterally spaced elongated flexible support members, means for joining said support members at the ends thereof, troughing roller assemblies extending laterally of said support members and supported thereon, said troughing roller assemblies being spaced throughout the length of said elongated flexible support members, locating means carried by each of said support members at the points of connection thereof for locating said troughing roller assemblies thereat, a support bracket at each end of each troughing roller assembly cooperating with said locating means, and means for shifting said elongated flexible support members whereby said locating means are so disposed that the troughing roller assemblies adopt positions normal to the longitudinal axis of said conveying reach, said last named means comprising a swivel member connecting one end of said support means, and means for taking up and relieving said support members.

7. In an endless conveyor having a conveying reach, a pair of laterally spaced elongated flexible support members, means for joining said support members at the ends thereof, troughing roller assemblies extending laterally of said support members and supported thereon, said troughing roller assemblies being spaced throughout the length of said elongated flexible support members, locating means carried by said support members at the points of connection thereof for locating said troughing roller assemblies thereat, a support bracket at each end of each troughing roller assembly cooperating with said locating means, and means for shifting said elongated flexible support members whereby said locating means are so disposed that the troughing roller assemblies adopt positions normal to the longitudinal axis of said conveying reach.

8. In an endless conveyor having a conveying reach, a pair of laterally spaced elongated flexible support members, means for joining said support members at the ends thereof, troughing roller assemblies extending laterally of said support members and supported thereon, said troughing roller assemblies being spaced throughout the length of said elongated flexible support members, locating means carried by each of said support members at the points of connection thereof for locating said troughing roller assemblies thereat, and means for shifting said elongated flexible support members whereby said locating means are so disposed that the troughing roller assemblies adopt positions normal to the longitudinal axis of said conveying reach.

9. In an endless conveyor having a conveying reach, a pair of laterally spaced elongated flexible support members longitudinally shiftable relative to each other, means for joining said members at the ends thereof, troughing roller assemblies extending laterally of said support members and supported thereon, said troughing roller assemblies being spaced throughout the length of said elongated flexible support members, locating means carried by each of said support members and projecting therefrom at the points of connection thereof for said troughing roller assemblies, and a support bracket at each end of each troughing roller assembly cooperating with said locating means.

10. In an endless conveyor having a conveying reach, a pair of laterally spaced elongated flexible support members longitudinally shiftable relative to each other, troughing roller assemblies extending laterally of said support members and supported thereon, said troughing roller assemblies being spaced throughout the length of said elongated flexible support members, locating means carried by each of said support members and projecting therefrom for said troughing roller assemblies, and means at each end of the troughing roller assemblies for connecting said troughing roller assemblies to said locating means.

11. In an endless conveyor having a conveying reach, a pair of laterally spaced elongated flexible support members longitudinally shiftable relative to each other, means for joining said members at the ends thereof, troughing roller assemblies extending laterally of said support members and supported thereon, said troughing roller assemblies being spaced throughout the length of said elongated flexible support members, locating means carried by each of said support members and projecting therefrom at the points of connection thereof for said troughing roller assemblies, and means at each end of the troughing roller assemblies for connecting said troughing roller assemblies at said locating means.

References Cited in the file of this patent

UNITED STATES PATENTS

| | | |
|---|---|---|
| 1,748,301 | McKinlay | Feb. 25, 1930 |
| 2,633,226 | Vogt | Mar. 31, 1953 |